United States Patent Office 2,944,927
Patented July 12, 1960

2,944,927

CURE OF CHLOROFLUOROCARBON ELASTOMER

Lucian P. Dosmann, South Bend, Ind., assignor to United States Rubber Company, New York, N.Y., a corporation of New Jersey No Drawing. Filed May 15, 1959, Ser. No. 813,344

8 Claims. (Cl. 154—100)

This invention relates to a method of accelerating the cure of a rubbery copolymer of monochlorotrifluoroethylene and vinylidene fluoride, and more particularly it relates to a method of accelerating the peroxide cure of such rubbery copolymers by means of N,N'-methylenebisacrylamide.

This application is a continuation-in-part of my application Serial No. 556,803, filed January 3, 1956, now abandoned.

The monochlorotrifluoroethylene-vinylidene fluoride elastomer is a commercially available type of synthetic rubber (sold under the trade name "Kel-F") described, for example, in an article by M. E. Conroy et al. entitled, "Kel-F Elastomer Properties, Compounding Vulcanization and Fabrication," appearing in the January, 1955 issue of "Rubber Age," pages 543–550, as well as in the article entitled, "Compounding Studies of Kel-F Elastomer" by Griffis and Montermoso, appearing in the July, 1955 issue of "Rubber Age," pages 559–562. This elastomer is a saturated polymer containing more than 50% fluorine by weight. Methylene groups are incorporated in the highly fluorinated polymer chain, thereby rendering the otherwise normally rigid chain elastic. The polymer chain is believed to consist essentially of $CH_2$, $CF_2$ and $CFCl$ groups. X-ray diagrams show that this polymer is amorphous at temperatures as low as $-40°$ C. On stretching to 300%, typical fiber diagrams are observed, indicating susceptibility to orientation and crystal formation. The polymer has good thermal stability, as shown by the fact that there is no evidence of chain scission or halogen loss after prolonged exposure at 440° F. Typical commercial polymers of this type contain chlorotrifluoroethylene and vinylidene fluoride in about equal amounts. Other monomer ratios, such as 60% monochlorotrifluoroethylene and 40% vinylidene fluoride, 30% monochlorotrifluoroethylene and 70% vinylidene fluoride, or 95% monochlorotrifluoroethylene and 5% vinylidene fluoride are also used.

Because this elastomer is fully saturated, it is not readily vulcanized by normal rubber curatives. However, it can be vulcanized with peroxides and certain other agents. Although the chemistry of this vulcanization is not fully understood, the marked increase in strength and solvent resistance after cure indicates that elastomer undergoes during cure a chemical change, producing a network or cross-linked type of structure.

The conventional peroxide cure of monochlorotrifluoroethylene-vinylidene fluoride elastomer has a serious practical disadvantage, in that it is extremely difficult to cure even thin films of the elastomer without "blowing" or development of porosity, since volatile peroxide decomposition products having difficulty in diffusing to surface of the stock as rapidly as they are formed. The cured products tend to have an unsatisfactory appearance and poor physical properties, because of the voids or bubbles formed during the peroxide cure. To mitigate this disadvantage it has been recommended to carry out the cure very slowly, for example, it is suggested to initiate the cure by heating for 30 minutes at 230° F. in a mold, after which the cure is completed by heating the article in an oven at 300° F. for prolonged periods, of up to 16 hours, depending on the thickness of the article. The necessity for such impracticably prolonged curing conditions has seriously limited the development of useful commercial products from the monochlorotrifluoroethylene-vinylidene fluoride elastomer.

Accordingly, a principal object of the present invention is to provide a more rapid cure of monochlorotrifluoroethylene-vinylidene fluoride elastomer. Another object is the provision of a curing method for such elastomer which yields a homogeneous vulcanizate of good physical properties. Still a further object is to provide a method of vulcanizing the present elastomer at essentially the same rate as other rubbers are vulcanized. Other objects and advantages will be made manifest in the following detailed description of the invention.

The invention is based on the unexpected discovery that if the peroxide cure of monochlorotrifluoroethylene-vinylidene fluoride elastomer is carried out in the presence of N,N'-methylenebisacrylamide as an accelerator, the vulcanization can be effected rapidly without detriment to the physical properties. This accelerator is a known, commercially available chemical and has the following formula

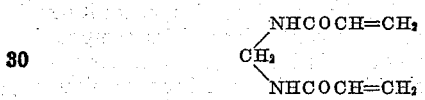

and is a stable powder which may be milled into or otherwise mixed with the present rubber in any desired suitable manner. The amount of the N,N'-methylenebisacrylamide accelerator employed is not critical, and it may be mentioned that although definite accelerating effect may be noted with as little as about 1 part by weight in 100 parts of the elastomer, it is usually preferred to use somewhat more than this, say, by way of non-limiting example, some 5 to 20 parts, and even more may be used if desired.

The peroxide is used in conventional amounts (e.g., about 1 to 5 parts) along with the accelerator of the invention. In general any conventional peroxide curative, whether organic or inorganic, may be used. Examples of suitable peroxides are disclosed in U.S. Patent 2,833,752, Honn et al., May 6, 1958. The peroxides employed are relatively stable at the temperature at which the elastomer is conventionally compounded, that is, the peroxide is relatively stable at temperatures below about 50° C. Benzoyl peroxide is preferred, but good results are also obtainable with di-tertiary-butyl peroxide at slightly higher curing temperatures. Less preferred are butyl hydroperoxide, dicumyl peroxide, calcium peroxide, and sodium peroxide. Tertiary-butyl perbenzoate, 2,2-di-(tertiary butyl peroxy) propane and 2,2-di(tertiary-butyl peroxy) butane may also be mentioned. Tertiary-butyl peracetate, succinic acid peroxide, or hydrogen peroxide may also be used. Conventionally the peroxide cure is also preferably activated with the aid of metal oxides such as zinc, calcium, aluminum and lead oxide, and lead salts, such as dibasic lead phosphite, tribasic lead maleate, and tribasic lead sulfate. Zinc oxide is especially preferred, since it imparts smooth processing characteristics along with minimum scorching tendencies. These oxides or salts are also preferably employed in the present invention. They may be used in conventional, noncritical amounts, e.g., 3 parts or more, preferably about 10 parts, although very large amounts, such as 50 or more parts, may be used to function as a filler or pigment. The vulcanizable mixture may further contain various other suitable conventional compounding ingredients if desired, such as fillers (e.g., precipitated silica, zinc oxide, carbon black), softeners or plasticizers, or it may be blended with other rubbers or plastics. Blends including polyisobutylene and/or polyethylene are particularly useful.

The vulcanization may be carried out in a mold or press in accordance with conventional compression or injection molding procedures, or the suitably pre-formed (e.g., molded, extruded, or calendered) elastomer may be cured in an oven or autoclave at atmospheric or elevated pressure in an atmosphere of air and/or ammonia, or steam, or any suitable inert gas. The curing conditions may vary widely, depending on the exact quantity and kind of curing materials, and depending on the exact properties and degree of cure desired in the final article, and also depending on the particular equipment and procedure used, as well as the size of the article and other variables. In general, it may be stated that useful cures are obtainable over much the same time and temperature ranges as may be employed in ordinary rubber vulcanization, e.g., curing times of from about 5 minutes to 24 hours at temperatures of from about 150° to 350° F., the longer times being employed with the lower temperatures.

A particularly advantageous aspect of the invention lies in the fact that by the use of the N,N'-methylenebisacrylamide acceleration of the peroxide cure as described, it is possible to cure the monochlorotrifluoroethylene-vinylidene fluoride elastomer in essentially the same curing cycle as would be suitable for ordinary vulcanizable rubber compounds, such as Hevea stocks, GR-S stocks, etc. Therefore, the invention makes it perfectly feasible to assemble composite articles comprised in part of the present vulcanizable present elastomer composition and comprised in part of some other vulcanizable rubber composition, and to cure the resulting assembly in such manner that both the present elastomer and the other rubber both achieve the desired degree of cure and have good physical properties. Formerly, the peroxide cure of monochlorotrifluoroethylene-vinylidene fluoride elastomer, without the accelerator of the invention, required the article to be heated for such prolonged periods of time that an ordinary rubber composition associated with the monochlorotrifluoroethylene-vinylidene fluoride elastomer would become severely over-cured or reverted, and would have unsatisfactory properties. Also, it was not feasible, in accordance with prior practice, to cure the monochlorotrifluoroethylene-vinylidene fluoride elastomer in association with fabric, such as cotton fabric, because the severe conditions of required time and temperature caused extensive degradation of the fabric. The present method is readily applicable to curing monochlorotrifluoroethylene-vinylidene fluoride elastomer calendered coatings or other kinds of coatings or laminates on fabrics and the like, without danger of injuring the fabric, because relatively mild vulcanizing conditions are effective.

The monochlorotrifluoroethylene-vinylidene fluoride rubber vulcanizates produced by the method of the invention display good resistance to various solvents and reactive chemical agents. This renders the vulcanizates useful in making such articles as protective clothing, for example, boots, gloves, aprons, etc., for use by workers handling highly dangerous and reactive chemicals, including acids and strong oxidizing agents, such as fuming nitric acid. The vulcanizates are also useful for lining tanks and the like used for storing or processing solvents and other chemicals, such as fuel cells for gasoline, etc. Collapsible rubber containers or barrels for storing or transporting liquid or solid chemicals may be made of the present vulcanizates. In such articles the vulcanizate may be reinforced if desired by laminating with fabric or other materials in the same manner that conventional rubber boots are provided with a fabric lining or conventional fuel cells are provided with embedded layers of fabric. In constructing such articles it is also sometimes advantageous to laminate or otherwise apply layers of other rubbers or plastics, such as natural rubber or synthetic rubbers such as GR-S or Butyl rubber, for the purpose of securing fabric layers in the assembly more firmly, or for other purposes. In this case, the above-mentioned features of the invention, whereby the accelerator enables other rubbers to be cured in the same curing cycle that produces optimum cure of the monochlorotrifluoroethylene-vinylidene fluoride rubber, may be used to good advantage.

Although the N,N'-methylenebisacrylamide is referred to herein as an accelerator of the peroxide cure of monochlorotrifluoroethylene-vinylidine fluoride elastomer, it is not intended by the use of the word "accelerator" to limit the invention to any particular mechanism or theory of operation, but the term "accelerator" is merely used in a general sense in recognition of the observed fact that the time of cure can be very much shortened when the N,N'-methylenebisacrylamide is present, while still avoiding porosity and while achieving good physical and chemical properties in the final vulcanizate. In a sense, the N,N'-methylenebisacrylamide might also be regarded as an activator of the cure, or even as a supplementary curing agent.

The following examples, in which all parts are expressed by weight, will serve to illustrate the practice of the invention in more detail.

EXAMPLE I

The elastomer employed in this example was a commercial material known as Kel-F, X-300 or 5500 (chlorotrifluoroethylene/vinylidene fluoride, 60/40), made by the M. W. Kellogg Company, having the form of a gum of the following properties:

Specific gravity _____ 1.85.
Fluorine content _____ <50%.
Color _____ Translucent, off-white.
Tensile (p.s.i.) _____ 300–600.
Elongation (percent) _____ 600–800.
Shore A Hardness _____ 40–45.
Intrinsic viscosity (methyl-
  ethyl ketone), 30° C. _____ 2–3.
Solubility (20% cements) ____ Ketones, esters, ethers.
Storage _____ >Two years.

This gum was mixed on a rubber mill with other ingredients, to provide the stock A shown in Table I, below. The elastomer was suitably milled at a mill roll temperature of 120–150° F. Zinc oxide and N,N'-methylenebisacrylamide were added and blended in by milling. The peroxide was then added and blended by further milling. The compound was then sheeted from the mill (face roll temperature 180° F.) or calender. The stock was then cured in an oven under the conditions set forth in Table I. The physical properties of the resulting vulcanizate were then determined, with the results shown in Table I. For comparison, Table I also shows the results reported for a conventional, very much prolonged two-stage cure (i.e. pressure cure followed by oven cure) in which the accelerator of the invention was not present (stock B).

The data in Table I show that the tensile, modulus, elongation and hardness are essentially the same for both compounds, yet the stock containing the accelerator of the invention had 14 hours less cure. Furthermore, the accelerated compound of the invention attained these physical properties rapidly in a single stage oven cure, without any necessity for a two-stage cure involving a pre-cure in a press.

The rate of cure obtained with the accelerated stock of the invention is equivalent to the rate of cure of natural rubber, thereby making it possible to cure properly a boot laminate made using natural rubber substrates and a monochlorotrifluoroethylene-vinylidene fluoride rubber exterior cover.

Table I
ACCELERATION WITH N,N'-METHYLENEBISACRYLAMIDE

| Ingredients | Parts | |
|---|---|---|
| | Stock A | Stock B |
| Kel-F elastomer X-300 or 5500 | 100 | 100 |
| Benzoyl peroxide | 3 | 3 |
| Zinc oxide (Kadox) | 10 | 10 |
| N,N'-Methylenebisacrylamide | 6 | |

CURING CONDITIONS

| | | |
|---|---|---|
| Press Cure: | | |
| Time (minutes) | none | 30 |
| Temperature (° F.) | | 230 |
| Oven Cure: | | |
| Time (hours) | 2.8 | 16 |
| Temperature (° F.) | ¹ 270 | 300 (air) |

PHYSICAL PROPERTIES AFTER CURE

| | | |
|---|---|---|
| Tensile strength (p.s.i.) | 1,193 | 1,350 |
| Elongation (percent) | 467 | 500 |
| Stress at 300% elongation (p.s.i.) | 681 | 530 |
| Hardness (Shore A) | 52 | 47 |

¹ Air-ammonia atmosphere.

EXAMPLE II

The physical properties of the monochlorotrifluoroethylene-vinylidene fluoride elastomer vulcanizates made in accordance with the invention can be varied over a wide range depending on the quantity of the N,N'-methylenebisacrylamide and the length of cure used. This is illustrated by the four stocks shown in Table II. These stocks were cured in an air-ammonia atmosphere, as in Example I, for 2.8 hours at a pressure of 35 pounds per square inch and a maximum temperature of 270° F. Portions of the stocks were also subjected to a longer cure of 16 hours at 280° F. (hot air at atmospheric pressure) with the results shown in the table.

Table II
EFFECT OF QUANTITY OF N,N'-METHYLENEBISACRYLAMIDE

| Ingredients | Parts | | | |
|---|---|---|---|---|
| | Stock C | Stock D | Stock E | Stock F |
| Kel-F elastomer C-183 | 100 | 100 | 100 | 100 |
| Plasticizer (bistrifluoromethylbenzene) | 10 | 10 | 10 | 10 |
| Zinc oxide (Kadox) | 10 | 10 | 10 | 10 |
| Benzoyl peroxide | 2.5 | 2.5 | 2.5 | 2.5 |
| N,N'-Methylenebisacrylamide | | 5 | 10 | 20 |

PHYSICAL PROPERTIES (2.8 HOUR CURE)

| | | | | |
|---|---|---|---|---|
| Tensile (p.s.i.) | 85 | 648 | 1,135 | 1,802 |
| Elongation (percent) | 1,350 | 668 | 481 | 209 |
| Modulus 300% (p.s.i.) | 82 | 279 | 797 | ¹ 1,733 |

PHYSICAL PROPERTIES (16 HOUR CURE)

| | | | | |
|---|---|---|---|---|
| Tensile (p.s.i.) | 1,029 | 1,866 | 2,050 | 3,016 |
| Elongation (percent) | 568 | 430 | 355 | 180 |
| Modulus 300% (p.s.i.) | 429 | 919 | 1,524 | ¹ 2,030 |

¹ At 200% elongation.

The data of Table II shows that 5 to 10 parts of N,N'-methylenebisacrylamide is the most effective quantity if a low modulus is desired in the 2.8 hour cure. The 16 hour cures with 5 to 10 parts of the accelerator of the invention increase the tensile strength with a corresponding increase in modulus. At 20 parts of accelerator, a very high modulus (1800 p.s.i.) is reached in the 2.8 hour air-ammonia cure.

EXAMPLE III

Table III shows the effect of various modifying ingredients on the physical properties. These stocks were cured in the form of thin films in the air-ammonia atmosphere, as in Example I.

Table III
EFFECT OF MODIFIERS IN KEL-F ELASTOMER

| | G | H | J | K | L | M |
|---|---|---|---|---|---|---|
| Kel-F elastomer (trade designation C-183) | 100 | 100 | 100 | 100 | 100 | 100 |
| Benzoyl peroxide | 3 | 3 | 3 | 3 | 3 | 2.5 |
| Zinc oxide (Kadox) | 10 | 10 | 10 | 10 | 10 | 10 |
| N,N'-Methylenebisacrylamide | 6 | 6 | 6 | 6 | 6 | 5 |
| Polyisobutylene (Trade designation Vistanex B-100) | | 15 | | | | |
| Polyethylene (Commercial grade known as DYLT) | | | 25 | | | |
| Polyethylene (Commercial grade known as AC-6) | | | | 10 | | |
| Vinyl ethyl ether | | | | | 10 | |
| Bistrifluoromethyl benzene | | | | | | 10 |

PHYSICAL PROPERTIES

| | | | | | | |
|---|---|---|---|---|---|---|
| Tensile strength (p.s.i.) | 1,193 | 660 | 1,305 | 815 | 525 | 648 |
| Elongation at break (percent) | 467 | 415 | 380 | 505 | 475 | 668 |
| Modulus at 100% elongation (p.s.i.) | | 120 | 530 | 175 | | 111 |
| Modulus at 200% elongation (p.s.i.) | | 260 | 662 | 300 | | 172 |
| Modulus at 300% elongation (p.s.i.) | 681 | 400 | 884 | 390 | 410 | 279 |
| Modulus at 500% elongation (p.s.i.) | | | | 760 | | 438 |
| Modulus at 700% elongation (p.s.i.) | | | | | | 557 |

The modifiers shown in Table III were added to improve the processing of the elastomer and to mitigate any tendency of the green film to crack under stress. Such stress cracking is prevalent in the conventional monochlorotrifluoroethylene-vinylidene fluoride elastomer compositions when stretched across the vamp area in making boots. The stock J in Table III, containing polyethylene, showed the greatest resistance to fracture at stress points, and was used in fabricating a boot.

EXAMPLE IV

This example illustrates the press curing of the monochlorotrifluoroethylene-vinylidene fluoride elastomer, using the accelerator of the invention. The two recipes shown in Table IV were cured in the form of ½ inch thick plugs in a press for 5 minutes at 300° F. This is in contrast with the recommended press cure of 30 minutes at 230° F., followed by 10 to 16 hours air cure at 300° F. for curing the same thickness of conventional monochlorotrifluoroethylene stock containing no N,N'-methylenebisacrylamide.

Table IV
PRESS CURED THICK SECTIONS OF KEL-F ELASTOMER

| | N | O |
|---|---|---|
| Kel-F elastomer C-183 | 100 | 100 |
| Zinc Oxide (Kadox) | 50 | 50 |
| Benzoyl peroxide | 3 | 3 |
| N,N'-Methylenebisacrylamide | | 6 |
| Press Cure (½" thick cavity) | 5 minutes at 300° F. | |

PHYSICAL PROPERTIES

| | | |
|---|---|---|
| Shore A Hardness (½ minute dwell time) | 15 | 55 |
| Porosity | Very porous. | None |

The plugs used in this example were made of plied up 30 mil films. The plugs were cut open after cure, and stock N was seen to be severely blown, while stock O had no porosity. The practical importance of this is that soles, heels and other thick molded monochlorofluorotriethylene-vinylidene fluoride elastomer articles can be made successfully.

EXAMPLE V

A film 17 mil thick of Stock E of Example II, after the 2.8 hour cure, was subjected to fuming white nitric acid in accordance with a standard test procedure. The stock withstood the acid for some 40 to 46 hours, indicating that the resistance of this stock was more than adequate for protective footwear.

EXAMPLE VI

A laminate was prepared comprised of a layer of Osnaburg fabric frictioned on one side with rubber stock, and on the other side with the calendered laminated film of monochlorofluorotriethylene-vinylidine chloride elastomer stock. The laminate was cured for 2 hours and 50 minutes in the above-described air-ammonia cure, and examination showed both the rubber layer and the monochlorofluorotriethylene-vinylidine chloride elastomer layer to be adequately cured. The sample was flexible, chemically resistant, and the fabric was strong and uninjured.

In contrast to this, a rubber compound specially prepared for cure at 16 hours at 280° F. (previously necessary for curing monochlorotrifluorodiethylene-vinylidine fluoride elastomer) had, after such cure, very good physical properties. It had no tensile strength and fractured when bent.

EXAMPLE VII

Good results were obtained with the following composition:

| | Parts |
|---|---|
| Kel–F elastomer | 100 |
| Zinc oxide | 10 |
| Benzoyl peroxide | 3 |
| N,N'-methylenebisacrylamide | 6 |
| Carbon black (E.P.C.) | 2 |
| Polyethylene | 10 |

The polyethylene was found to offer improved acid resistance and it also served as a processing aid. Other peroxides, such as di-tertiary-butyl peroxide, can be substituted for the benzoyl peroxide.

EXAMPLE VIII

| Ingredients | Parts | | |
|---|---|---|---|
| | Stock AA | Stock BB | Stock CC |
| Kel-F Elastomer 5500 | 100 | 100 | 100 |
| Magnesium Oxide | 10 | 10 | 10 |
| Tertiary butyl peracetate (Lupersol #7) | 2.5 | 2.5 | 2.5 |
| N,N'-Methylenebisacrylamide | 0 | 10 | 15 |

PHYSICAL PROPERTIES (2.8 HOUR CURE IN AIR-AMMONIA ATMOSPHERE AT 270° F.)

| | | | |
|---|---|---|---|
| Tensile (p.s.i.) | 668 | 2,378 | 2,800 |
| Elongation (Percent) | 694 | 281 | 227 |
| Modulus 100% Elongation | 205 | 770 | 1,271 |
| Modulus 200% Elongation | 302 | 1,546 | 2,451 |
| Modulus 300% Elongation | 377 | 2,352 | |

EXAMPLE IX

| Ingredients | Parts | | |
|---|---|---|---|
| | Stock DD | Stock EE | Stock FF |
| Kel- Elastomer 5500 | 100 | 100 | 100 |
| Magnesium Oxide | 10 | 10 | 10 |
| t-Butyl Perbenzoate | 2.5 | 2.5 | 2.5 |
| N,N'-Methylenebisacrylamide | 0 | 10 | 15 |

EXAMPLE IX—Continued

PHYSICAL PROPERTIES (2.8 HOUR CURE IN AIR AMMONIA ATMOSPHERE AT 270° F.)

| Ingredients | Parts | | |
|---|---|---|---|
| | Stock DD | Stock EE | Stock FF |
| Tensile (p.s.i.) | 480 | 2,119 | 2,737 |
| Elongation (Percent) | 506 | 292 | 236 |
| Modulus 100% Elongation | 215 | 705 | 1,275 |
| Modulus 200% Elongation | 292 | 1,395 | 2,333 |
| Modulus 300% Elongation | 350 | 2,098 | |

EXAMPLE X

| Ingredients | Parts | | |
|---|---|---|---|
| | Stock GG | Stock HH | Stock JJ |
| Kel-F Elastomer 5500 | 100 | 100 | 100 |
| Magnesium Oxide | 10 | 10 | 10 |
| Succinic Acid Peroxide | 2.5 | 2.5 | 2.5 |
| N,N'-Methylenebisacrylamide | 0 | 10 | 15 |

PHYSICAL PROPERTIES (2.8 HOUR CURE IN AIR AMMONIA ATMOSPHERE AT 270° F.)

| | | | |
|---|---|---|---|
| Tensile (p.s.i.) | 930 | 2,438 | 2,007 |
| Elongation (Percent) | 508 | 174 | 241 |
| Modulus 100% Elongation | 275 | 1,482 | 1,229 |
| Modulus 200% Elongation | 452 | 2,809 | 1,670 |
| Modulus 300% Elongation | 606 | | |

EXAMPLE XI

| Ingredients | Parts | | |
|---|---|---|---|
| | Stock KK | Stock LL | Stock MM |
| Kel-F Elastomer 5500 | 100 | 100 | 100 |
| Magnesium Oxide | 10 | 10 | 10 |
| Hydrogen Peroxide (16.5% Active Oxygen) | 1.5 | 1.5 | 1.5 |
| N,N'-Methylenebisacrylamide | 0 | 10 | 15 |

PHYSICAL PROPERTIES (2.8 HOUR CURE IN AIR-AMMONIA ATMOSPHERE AT 270° F.)

| | | | |
|---|---|---|---|
| Tensile (p.s.i.) | 1,437 | 1,646 | 1,605 |
| Elongation (percent) | 474 | 417 | 355 |
| Modulus 100% Elongation | 257 | 486 | 609 |
| Modulus 200% Elongation | 474 | 753 | 905 |
| Modulus 300% Elongation | 750 | 1,082 | 1,295 |

From the foregoing, it will be apparent that the invention has many advantages. The N,N'-methylenebisacrylamide is readily blended with the monochlorotrifluoroethylene-vinylides fluoride elastomer at temperatures sufficiently elevated for easy mastication without decomposition or rapid reaction with the elastomer. The N,N'-methylenebisacrylamide can in general be safely handled on mills and calenders. It has a low level of toxicity and apparently does not produce objectionable by-products such as obnoxious gases. The decomposition products of the curing reaction do not produce gases in large enough volume to cause blowing or porosity in the elastomer. This makes it possible to cure solid, impervious film and slabs of the monochlorotrifluoroethylene-vinylidene fluoride elastomer.

The present accelerator promotes rapid cures of monochlorotrifluoroethylene-vinylidene fluoride elastomer at a low concentration and therefore it does not detract from the physical properties. This, coupled with its low cost, makes it a very economical accelerator. Since it is a white crystalline powder, it is ideal for light colored monochlorotrifluoroethylene-vinylidene fluoride elastomer stocks.

While it is not desired to limit the invention to any particular theory of operation, it appears possible that the N,N'-methylenebisacrylamide is activated by the peroxide to produce a free radical which in turn is more reactive than the peroxide. In this connection it is interesting to compare the structures of acrylamide and N,N'-methylenebisacrylamide:

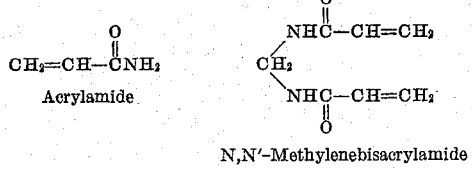

N,N'-Methylenebisacrylamide

One will note that the structures are identical except that in the bis compound two molecules of acrylamide are connected by a methylene group. Although the structures are similar, the acrylamide fails to accelerate the cure, whereas the N,N'-methylenebisacrylamide most surprisingly has a powerful accelerating action. This is a particularly unexpected result in that amine compounds commonly poison or neutralize the effect of peroxides. The uniqueness of this new accelerating action by N,N'-methylenebisacrylamide is emphasized by the fact that numerous tests were made in attempts to duplicate this action with other chemicals, but they all failed.

Having thus described my invention, what I claim and desire to protect by Letters Patent is:

1. In that method of curing a saturated elastomer which is a copolymer of chlorotrifluoroethylene and vinylidene fluoride, the said copolymer containing from 5% to 70% of vinylidene fluoride copolymerized therein, in which 100 parts of the said elastomer is heated in admixture with from 1 to 5 parts of a peroxide as a curing agent, the said peroxide being relatively stable at temperatures at which said elastomer is conventionally compounded, the improvement which comprises the step of carrying out the said cure in admixture with from 1 to 20 parts of N,N'-methylenebisacrylamide as an accelerator, the said cure being carried out at a temperature of from 150° to 350° F. for a period of from 5 minutes to 24 hours.

2. A method as in claim 1 in which the said peroxide is an organic peroxide.

3. A method as in claim 2 in which the said organic peroxide is benzoyl peroxide.

4. A method of curing saturated elastomer which is a copolymer of chlorotrifluoroethylene and vinylidene fluoride, said copolymer containing from 5% to 70% of vinylidene fluoride copolymerized therein, comprising heating 100 parts of the said elastomer at a temperature of from 150° to 350° F. for a period of from 5 minutes to 24 hours in admixture with from 1 to 5 parts of benzoyl peroxide as a curing agent, from 1 to 20 parts of N,N'-methylenebisacrylamide as an accelerator, and from 3 to 50 parts of zinc oxide.

5. A vulcanizate comprising 100 parts of a saturated elastomer which is a copolymer of chlorotrifluoroethylene and vinylidene fluoride, said copolymer containing from 5% to 70% of vinylidene fluoride copolymerized therein, cured with from 1 to 5 parts of a peroxide as a curing agent and from 1 to 20 parts of N,N'-methylenebisacrylamide as an accelerator, the said peroxide being relatively stable at temperatures at which said elastomer is conventionally compounded.

6. A vulcanizate as in claim 5 in which the peroxide is benzoyl peroxide.

7. A vulcanizate as in claim 6, containing zinc oxide.

8. A method of making a laminated article having a layer made of unsaturated, vulcanizable rubber and a layer made of a saturated elastomer which is a copolymer of monochlorotrifluoroethylene and vinylidene fluoride, containing from 5% to 70% of vinylidene fluoride, comprising compounding said unsaturated, vulcanizable rubber for sulfur vulcanization, compounding 100 parts of said saturated elastomer with from 1 to 5 parts of a peroxide as a curing agent and from 1 to 20 parts of N,N'-methylenebisacrylamide as an accelerator, whereby the compounded unsaturated, vulcanizable rubber has a curing rate substantially similar to the curing rate of the compounded saturated elastomer, laminating the resulting two compounded stocks, and curing the laminate at a temperature of from 150° to 350° F. for a period of from 5 minutes to 24 hours.

References Cited in the file of this patent

UNITED STATES PATENTS

| | | |
|---|---|---|
| 2,475,846 | Lundberg | July 12, 1949 |
| 2,833,752 | Honn et al. | May 6, 1958 |